(No Model.)
A. D. GARRETSON.
CASTER WHEEL.
No. 282,626. Patented Aug. 7, 1883.
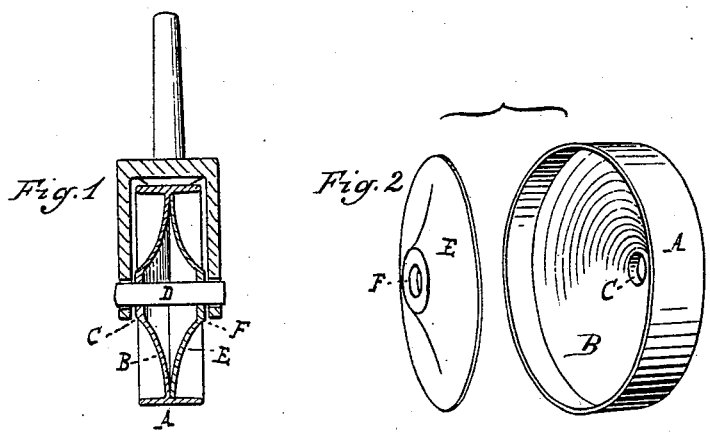
Attest:
A. Barthel
Charles J. Hunt
Inventor:
Albert D. Garretson
by his Att'y

UNITED STATES PATENT OFFICE.

ALBERT D. GARRETSON, OF DETROIT, MICHIGAN, ASSIGNOR TO CHRISTIAN H. HABBERKORN, OF SAME PLACE.

CASTER-WHEEL.

SPECIFICATION forming part of Letters Patent No. 282,626, dated August 7, 1883.

Application filed November 20, 1882. (No model.)

*To all whom it may concern:*

Be it known that I, ALBERT D. GARRETSON, of Detroit, in the county of Wayne and State of Michigan, have invented new and useful Improvements in Caster-Wheels; and I do hereby declare that the following is a full, clear, and exact description thereof, reference being had to the accompanying drawings, which form a part of this specification.

The nature of this invention relates to certain new and useful improvements in the construction of caster-wheels, by means of which much of the labor required to manufacture such wheels as ordinarily made is avoided, while just as serviceable wheels are produced.

The invention consists in the peculiar construction and combination of parts, as more fully hereinafter described.

As ordinarily made caster-wheels are cast in one piece, with a hub as long, or nearly so, as the width of the tread, in order to give a proper support or bearing for the axle. The center of the hub is bored or drilled out to receive such axle, and the longer the hub the greater the difficulty of doing this.

The object of this invention is to so construct such wheels as to avoid the necessity of such boring or drilling and present suitable bearings for the axle.

Figure 1 is a central vertical section of a detached caster-wheel, showing the interior of the wheel. Fig. 2 is a view of the parts of the wheel proper separate from each other.

In the accompanying drawings, which form a part of this specification, A represents the rim or tread of the wheel, the outer surface, B, of said wheel being convex, as shown, and with its inner face concave. In casting this part of the wheel the hub C is cored or molded to form the center bearing for the axle D. The other part, E, of the wheel is in the form of a convex and concave disk, the hub F of which is also cored or molded, so that when the two parts of the wheel are in their true relative positions the bearings for the axle will be coincident in each. This disk E is sufficiently smaller than the internal diameter of the tread so as to fit therein snugly, with the bore in its hub coincident with the bore in the hub of the other part of such wheel. By this construction a lighter wheel is obtained, hollow, and with a hub so cored out or molded as to obviate the necessity of boring or drilling, while at the same time equally good bearings are obtained as in the common way of manufacturing such wheels.

I am aware of the Patent No. 198,247 for a pulley-block, in which the wheel is made in two parts, secured together by screws to prevent the force of the rope in the peripheral groove from destroying the device, and such construction is not sought to be covered in this application. In my device it will be observed that the bearing of both faces of the wheel is against the holding-frame to keep the parts together, and that the face F is intended as an auxiliary strengthening device for the face B.

What I claim as my invention is—

In a caster-roller, a flat rim or tread and a concavo-convex disk or face extending from its inner central surface inwardly and outwardly to an axial aperture, and a similarly-formed auxiliary disk adapted to be placed within the rim in a reverse position, so that the outer lateral bearings through the holding-frame will keep the parts together, as and for the purposes set forth.

ALBERT D. GARRETSON.

Witnesses:
E. SCULLY,
C. J. HUNT.